United States Patent

Hill

[11] 4,046,017
[45] Sept. 6, 1977

[54] WHEEL BALANCING APPARATUS

[75] Inventor: Jerry M. Hill, North Little Rock, Ark.

[73] Assignee: FMC Corporation, San Jose, Calif.

[21] Appl. No.: 751,237

[22] Filed: Dec. 16, 1976

[51] Int. Cl.$^2$ .............................................. G01M 1/22
[52] U.S. Cl. ........................................ 73/462; 73/464
[58] Field of Search ................ 73/462, 464; 235/151.3

[56] References Cited

U.S. PATENT DOCUMENTS

| 3,184,976 | 5/1965 | Greiner | 73/462 |
| 3,774,456 | 11/1973 | Crump | 73/462 |

Primary Examiner—James J. Gill
Attorney, Agent, or Firm—R. S. Kelly; T. J. McNaughton; C. E. Tripp

[57] ABSTRACT

A wheel balancing apparatus for balancing an out-of-balance wheel that is mounted on a rotatable shaft includes force transducers positioned in a horizontal plane against resiliently supported bearings for the shaft to thereby detect horizontal components of the imbalance forces created by the out-of-balance wheel. Photosensitive switches associated with the shaft produce phase-displaced analog signals, which signals are supplied to a pulse producing circuit for generating a train of count pulses on one of two output lines depending upon the direction of rotation of the shaft. A counter, which has a capacity exactly equal to the number of pulses generated by the pulse producing circuit per revolution of the shaft, is set when the horizontal component of the imbalance force for a particular correction plane associated with the counter equals zero. When a command to stop spinning the shaft has been issued, the shaft will slow down until it comes to a stop but the counter will continue to count through each cycle of shaft revolution so that it will stop at a position wherein the relative rotative position of the unbalanced weight can be determined. A digital-to-analog converter responsive to the counter output provides a ramp voltage to drive a null meter and thereby permit the operator to rotate the wheel after it stops until the position of weight imbalance for the particular correction plane is provided in the predetermined location for providing a corrective weight—as is ascertained by bringing the null meter to the null position.

7 Claims, 4 Drawing Figures

FIG_1
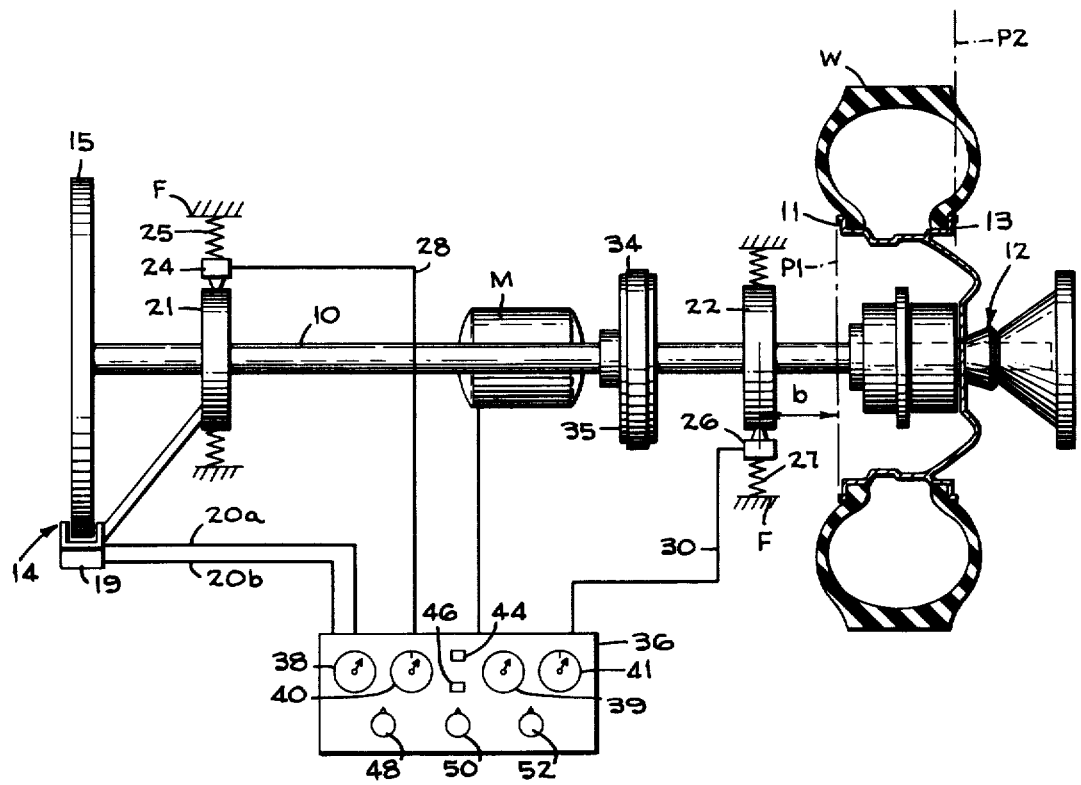
FIG_3
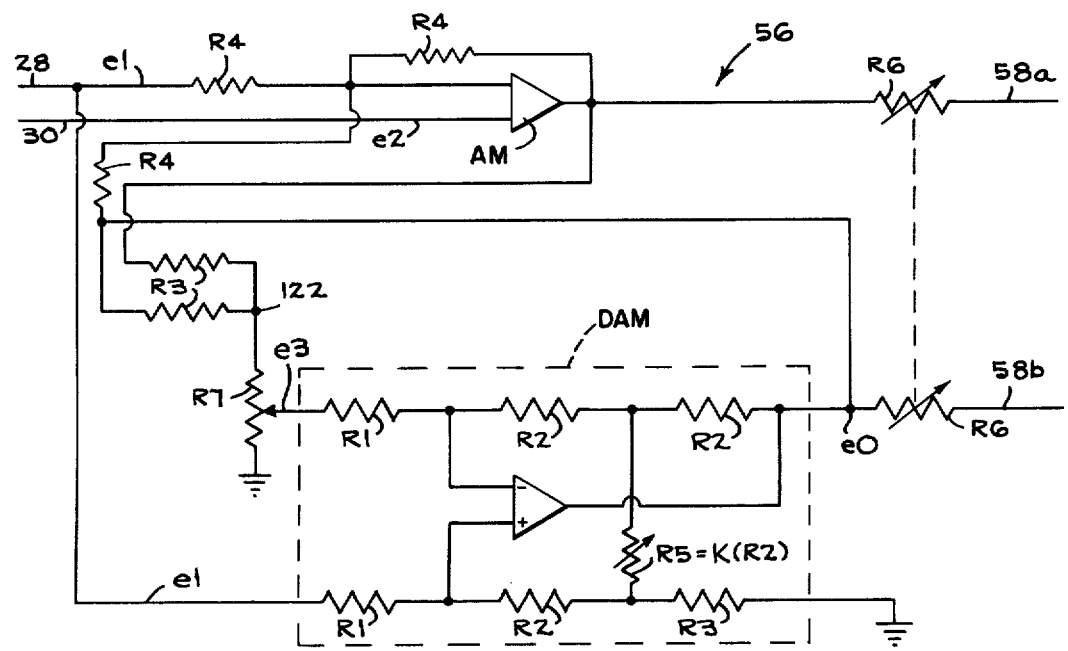

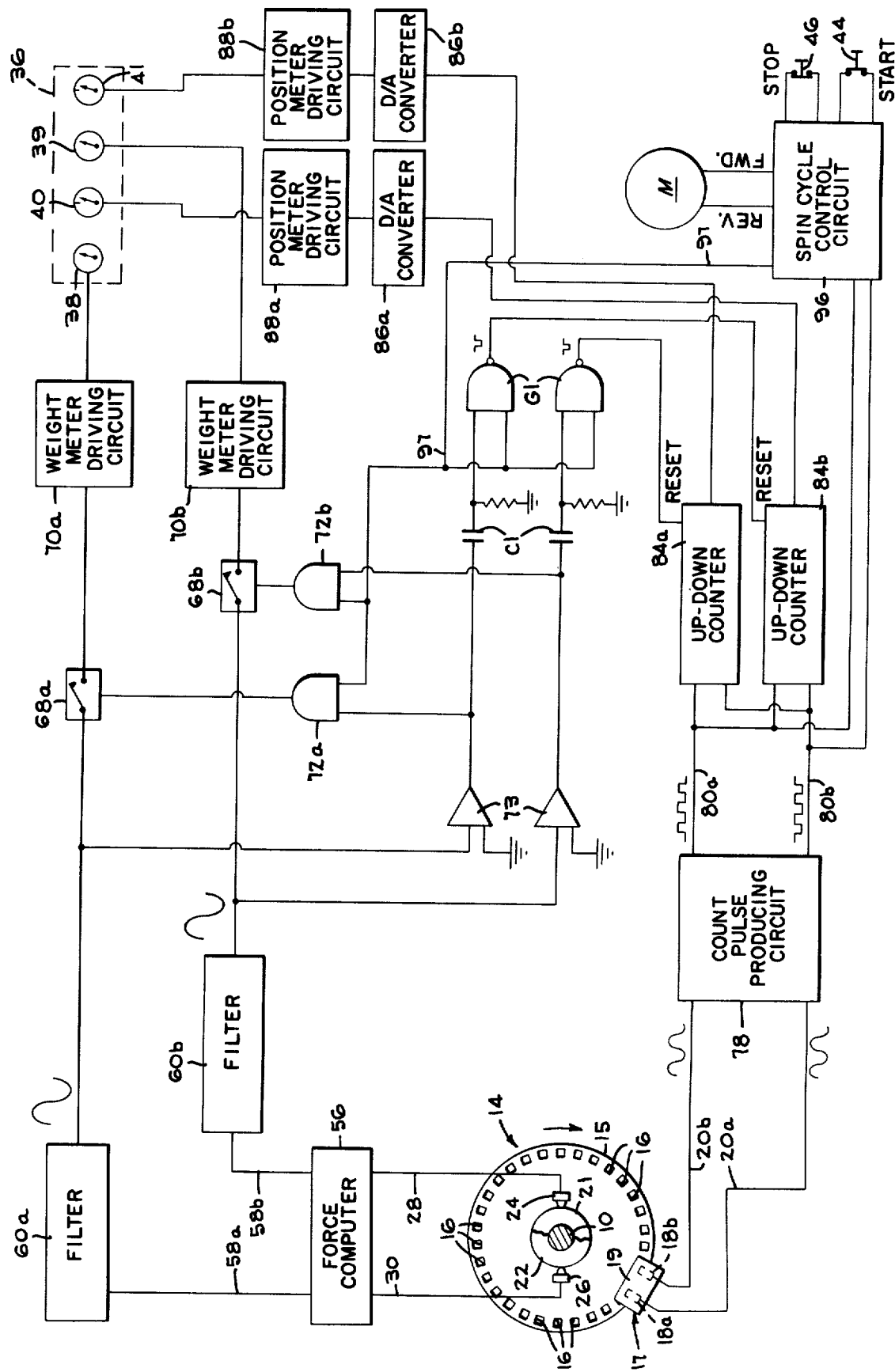
FIG_2

WHEEL BALANCING APPARATUS

BACKGROUND OF THE INVENTION

1. Field of the Invention

The present invention generally relates to apparatus for balancing out-of-balance rotary bodies and more particularly concerns an apparatus for measuring the magnitude and angular position of imbalance in at least one plane of a rotary body such as a motor vehicle wheel.

2. Description of the Prior Art

In the dynamic balancing of a rotary body such as a motor vehicle wheel, the wheel is rotated on the vehicle with measurements made directly thereto, or the wheel is removed from the vehicle and mounted on a special drive shaft and then rotated. When the drive shaft and wheel are spun, the out-of-balance forces cause the drive shaft to move slightly off-axis in a measuring plane, and force transducers in the measuring plane provide signals which are proportional to the magnitude of the unbalanced forces. The location of the unbalanced weight is then determined, by means of the transducers, with respect to the planes through the inner and outer rims of the wheels. To then bring the wheel into dynamic and static balance the operator applies weight to the inner and outer rims of the wheel at the unbalanced weight locations as determined by the transducers until the drive shaft remains on-axis as the wheel is rotated.

In U.S. Pat. No. 3,835,712 to Muller, an apparatus for dynamically balancing a rotary body is disclosed wherein the wheel to be balanced is rotated on a balancing shaft. A phase displacement device (i.e., a synchro or a resolver) is also provided on the shaft. The shaft is rotated to spin the wheel at its normal rotational speed, and a force transducer produces a force signal which is indicative of the magnitude of the unbalanced wheel weight. The location of the unbalanced weight is provided in an output signal by using the force signal to phase shift a reference voltage by an angular amount indicative of the position of the unbalanced weight. As the wheel is subsequently slowed to a stop, the reference voltage is applied to the stator windings of the phase displacement device so that the rotor thereof will provide an output signal comprising the reference voltage phase shifted by an amount indicative of the position of the wheel. When the wheel stops, the two phase shifted signals are compared by means including a null meter, and the wheel is rotated until a null is obtained at which time the unbalanced weight position will be in a predetermined rotative position of the wheel so that the balancing weight can be accurately and easily added to the wheel. While the balancing apparatus of the Muller patent operates in an entirely satisfactory and accurate manner, it will be recognized that it is comprised of complex and expensive components which significantly add to the cost of the apparatus.

In U.S. Pat. No. 3,910,121 to Curchod et al, a two-plane dynamic wheel balancing machine is disclosed which includes a force transmission member which is supported for movement in one plane. The drive shaft of the balancer is mounted on the force transmission member such that the imbalance forces tend to move the member in the plane in which it is mounted, and force transducers produce signals indicative of the position and magnitude of the imbalance forces in the two planes of the wheel to be balanced. A photoelectric device produces a reference signal when the shaft rotates through a predetermined reference position, and another photoelectric device produces position pulse signals indicative of the angular position of the shaft with respect to said reference signal. The position pulses are counted, and the counter is read when the unbalanced weight is in a predetermined rotative position of the wheel. When the wheel stops, the operator rotates the wheel until the counter reading is again at the number which indicates said predetermined rotative wheel position where the balancing weights are applied.

U.S. Pat. No. 3,732,737 to Forster discloses a two-plane dynamic wheel balancing apparatus which operates in a manner similar to that of the aforedescribed Curchod et al device in that the positions at which the counterbalance weights are to be attached to the wheel rims are determined by measuring the phases of analog signals from the force transducers relative to some fixed reference point on the balancing shaft.

SUMMARY OF THE INVENTION

It is an object of the present invention to provide a dynamic wheel balancing apparatus having a position finding system which does not require a reference signal associated with a predetermined rotative position of the balancing shaft.

A further object of the present invention is to provide a relatively simple but accurate electronic system for indicating the direction in which a wheel must be turned to bring it into the rotative position where a counterbalance weight should be applied and for further indicating directly to the operator when such rotative position is reached.

The present invention provides an apparatus for measuring the imbalance of a rotary body such as an automobile wheel in at least one plane, but preferably two planes, which planes are normal to the axis of rotation of the wheel. The apparatus includes means for rotating the wheel, means for detecting forces generated by the imbalance in the plane of concern and for generating a signal representative of the magnitude of the imbalance in the plane, means for generating pulses in timed relation to the rotation of the wheel, a counter responsive to the generated pulses for indicating the angular position of said wheel, means responsive to the signal from the detecting means to enable the counter to start counting when the angular position of the unbalanced weight is at a preselected rotative wheel orientation, means for providing an output signal from the counter to visually indicate when the wheel is in said preselected rotative position, and means responsive to the signal from the force detecting means for determining and displaying the magnitude of the imbalance in the plane so that after the wheel has been spun and then stopped the operator can readily rotate the wheel to the indicated preselected rotative position and apply the correct counterbalancing weight as indicated by the imbalance magnitude display means.

BRIEF DESCRIPTION OF THE DRAWINGS

FIG. 1 is a diagrammatic plan view of the wheel balancing apparatus of the present invention.

FIG. 2 is a block diagram of the electrical circuitry of the apparatus of the present invention.

FIG. 3 is a schematic diagram of a part of the electrical circuitry of FIG. 2 particularly illustrating the circuitry of the force computer which generates the analog unbalance force signals representative of the magnitudes and positions of the weights to be added to the inner and outer planes of the wheel under test.

DESCRIPTION OF THE PREFERRED EMBODIMENT

Figure 4:
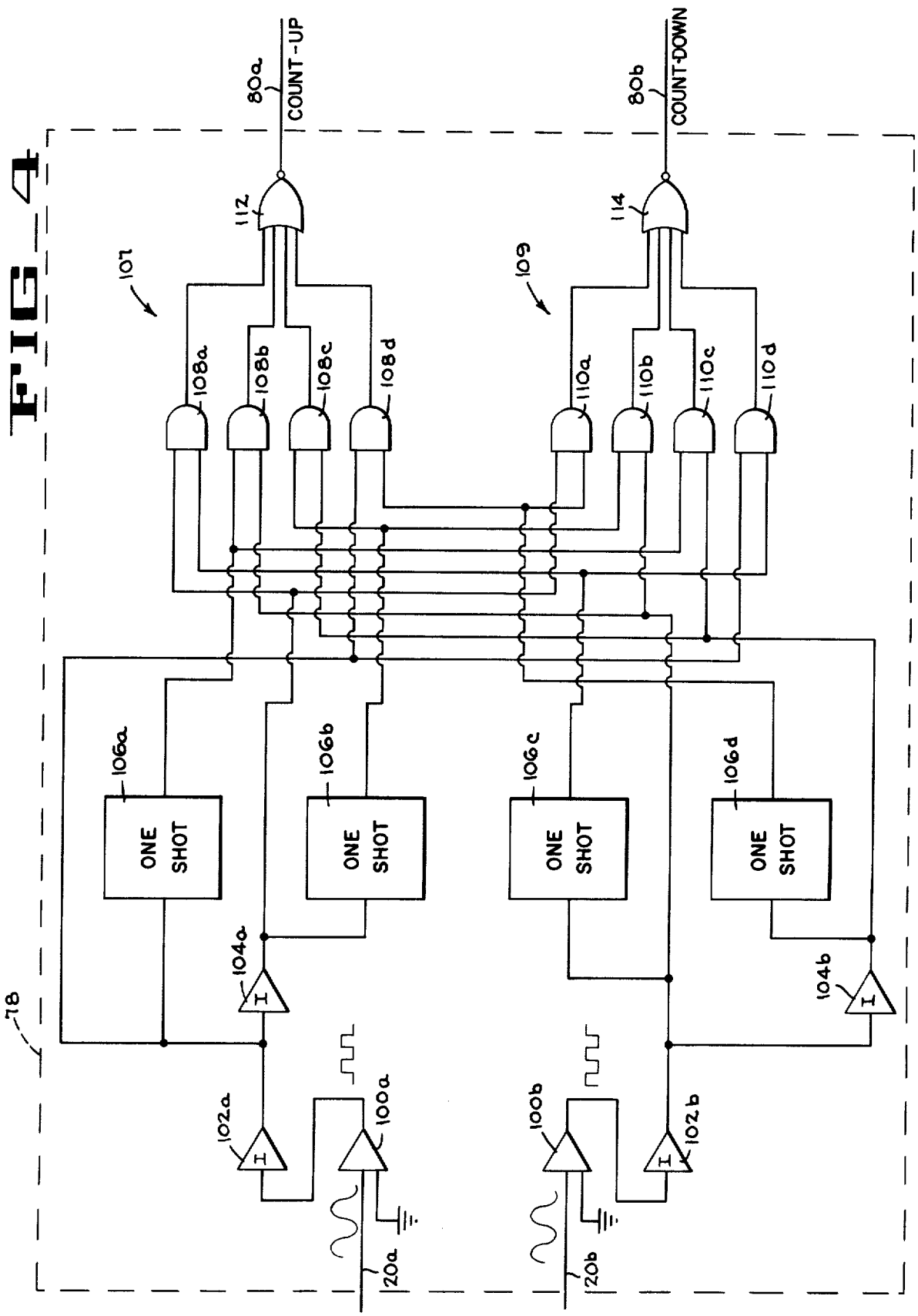
FIG. 4 is a schematic diagram of another part of the circuitry of FIG. 2 particularly illustrating the count pulse producing circuit which produces count-up or count-down pulses in dependence upon the direction and rate of rotation of the balancing shaft.

The wheel balancing apparatus of the present invention, as illustrated in FIG. 1, includes a shaft 10 having a clamping assembly 12 at one end thereof for detachably securing a wheel W in a plane normal to the axis of the shaft 10. An encoder disc and optical switch assembly 14 for producing analog signal outputs on lines 20a and 20b is fixed to the end of the shaft opposite from that upon which the wheel is mounted. The signals on lines 20a and 20b are representative of the angular amount of rotation of the shaft 10. The shaft is free to rotate in a pair of spaced bearings which are resiliently mounted in axially spaced housings 21 and 22 in a manner which allows the shaft and bearing housing assembly to deflect in a horizontal plane when subjected to out-of-balance forces produced by an unbalanced wheel W. Electrical force measuring elements, or transducers, 24 and 26, which are mounted between the bearing housings 21 and 22 and the fixed frame structure F of the apparatus in the horizontal plane, produce signals on output leads 28 and 30, respectively, which represent the magnitude of the unbalance forces exerted on the bearing housings 21 and 22, respectively. Details of the mounting of the bearings and the transducers will be discussed hereinafter. The shaft 10 is driven by a reversible electric motor M which has a drive pulley on which a belt 34 is entrained to transmit drive to a pully 35 keyed to the shaft 10. The motor is located directly below and in axial alignment with the balancing shaft 10.

Switches, dials and meters for controlling and monitoring the balancing operation are located on a console board 36. A weight meter 38 displays the magnitude of the counterbalance weight which must be applied to the inner rim 11 of the wheel W, and a meter, or display device, 40 indicates the position at which such weight should be applied to the rim 11. Preferably, the position meter 40 is of the null indicating type having a needle and a fixed scale with a zero, or null, mark at the center thereof. Meters 39 and 41, which are similar to the meters 38 and 40 respectively, indicate the magnitude and position of the counterbalancing weight for the outer rim 13 of the wheel. It should be understood that other types of positions indicating displays can be used with the circuitry of the present invention. Also mounted on the console board 36 are a start switch 44 and a stop switch 46. Since wheels to be balanced may vary in diameter and in width, and since the positions of the inner and outer rims 11 and 13 may vary in the offset distance from the bearing housing 22, the console 36 further includes dials 48, 50 and 52 for providing a force computer 56, to be described hereinafter, with the following wheel-related parameters: the dial 48 provides an indication of the diameter (or radius) of the rims 11 and 13; the dial 50 provides an indication of the width of the wheel (the distance between the planes P1 and P2 (FIG. 1) through the rims 11 and 13); and the dial 52 provides an indication of offset distance from the transducer 26 to the plane P1. The dials 48, 50 and 52 are manually settable by the operator prior to the start of the balancing operation.

The bearing housings 21 and 22 are resiliently supported by vertical leaf springs (not illustrated) which allow the shaft, bearings, and drive pulley assembly to deflect generally in a horizontal plane when subjected to out-of-balance centrifugal forces produced by an unbalanced wheel. The force transmitting elements, or transducers, 24 and 26 comprise piezoelectric crystal devices interposed between the respective bearing housings 21 and 22 and the frame F for the balancing apparatus. Springs 25 and 27 are used in a known manner between the transducers and the frame to maintain the transducers 24 and 26, respectively, in force-measuring contact with their associated bearing housings. The transducers are mounted to lie in a horizontal plane containing the centerline of the shaft 10 and thus produce sinusoidal signals proportional to the horizontal components of the unbalance forces generated by the unbalanced wheel W as the wheel is spun.

As illustrated in FIGS. 2 and 3, the signal outputs of the transducers 24 and 26 are conveyed on lines 28 and 30 to the force computer 56 which provides sinusoidal output signals on lines 58a and 58b therefrom. The output signals on lines 58a and 58b are indicative of the magnitudes and positions of the weight to be added to the wheel in planes P1 and P2, respectively. Thus, the force computer, which is known in the prior art, functions to compute from the unbalanced force signals in the planes of the transducers the counterbalancing weight signals in the rim planes P1 and P2. Due to the positioning of the transducers in a horizontal plane and the restricted horizontal deflection of the bearing housings 21 and 22 in the horizontal plane, the heavy (i.e., unbalanced weight) spots for the respective planes P1 and P2 will be at bottom-dead-center on the rims 11 and 13 when the phase angles of the signals on the respective lines 58a and 58b are each 180°. Thus, at such a phase angle, the position on a rim at which a weight should be placed is at top-dead-center. It will be appreciated that any desired rotative wheel position of weight emplacement is possible with the present invention; a top-dead-center emplacement position has been chosen since such location represents the easiest position to apply the counterbalancing weights.

The computation of the magnitudes of the counterbalance weights to be added to the wheel in the planes P1 and P2 to bring the wheel W into dynamic and static balance may be made according to the following equations:

$$w(2) = aF(1) + b[F(1) - F(2)]/c \qquad \text{(Eq. 1)}$$

$$w(1) = F(2) - F(1) - w(2) \qquad \text{(Eq. 2)}$$

wherein $w(1)$ and $w(2)$ are the magnitudes of the out-of-balance forces acting respectively in planes P1 and P2 effective at the wheel rims 11 and 13 (such forces thus being proportional, when they are at their maximums, to the amount of counterbalance weights to be added to rims to bring the wheel W into static and dynamic balance); $F(1)$ and $F(2)$ are the magnitudes of the horizontal forces exerted on the transducers 24 and 26, respectively, by the rotating and oscillating shaft 10; $a$ is the axial distance between transducers 24 and 26; $b$ is the axial offset distance between the plane P1 and the transducer 26; and $c$ is the distance between the planes P1 and P2, i.e., the width of the wheel W. The values of the counterbalance weights, to be applied at positions displaced 180° from the heavy spots where the maximum values of the unbalance forces w(1) and w(2) are applied, equal the magnitudes of the maximum out-of-balance forces divided by the radius, r, of the wheel W, that is, w(1)/r and w(2)/r for the planes P1 and P2, respectively.

Inasmuch as the circuitry for force computer 56 for accomplishing the computations according to equations 1 and 2 is known in the prior art and will be obvious to those skilled in the electronic wheel balancer art, only a brief discussion of a preferred embodiment of the force computer 56 is presented herein. As shown in FIG. 3, the force computer 56 includes a first stage including an amplifier AM having its non-inverting terminal connected to the line 30 from the force transducer 26. A voltage e2 representative of the force F(2) exerted on the transducer 26 is provided on line 30. The inverting terminal of the amplifier AM has a voltage applied thereto which is the sum of a voltage e1, which is proportional to the force F(1) exerted on the transducer 24 via line 28, and the output voltage e0 of a second stage of the force computer 56, which corresponds to the value of force w(2). See equation 2 above. The output signal from the amplifier AM will thus be representative of the force magnitude w(1) which output is applied to a variable resistor R6 of a settable value proportional to the radius r of the wheel, to thereby provide a signal proportional to the value of the counterweight to be added to rim 11. The value of resistor R6 is set by the console dial 48.

The second stage of the computer 56 includes a simple adjustable gain differential amplifier DAM, the gain of which is controlled by a variable resistor R5 of the value K(R2) with the value of K being set by the wheel width dial 50. The differential amplifier DAM includes four matched resistors R2 and two matched resistors R1. The output voltage e0 of the differential amplifier is:

$$e0 = 2(1 + 1/K)(R2/R1)(e1-e3) \quad (Eq. 3)$$

The input voltage to the non-inverting terminal of the differential amplifier DAM is proportional to the force F(1). The output of the differential amplifier DAM is fed back through a first one of a pair of matched resistors R3 and summed at point 122 with the output of the amplifier AM through the other of the matched resistors R3. The voltage at 122 is applied to a potentiometer R7 and the output voltage thereof is the voltage e3 which is then applied to the inverting terminal of the differential amplifier. The value of resistance of the pot R7 is set by the offset dial 52 to be proportional to the value of the offset distance b (see FIG. 1).

When the pot R7 is set to indicate an offset distance of zero, the value of the resistance will equal zero, thereby grounding the input to the inverting terminal of the differential amplifier DAM. This makes e3 in equation (3) equal zero; hence, the output voltage e0 which represents w(2), will equal 2(1 + 1/K)(R2/R1) e1. Comparing equations 1 and 3, the ratio of a/c in equation 1 will be found to equal 2(1 + 1/k)(R2/R1) in equation 3. When the pot R7 is set to indicate an offset distance other than zero, the input voltage e3 to the inverting terminal will be of a value set by the pot R7, and the output voltage e0 will be a function of the wheel width parameter K set by the dial 50 through resistor R5.

Now referring again to FIG. 2, the output signals on lines 58a and 48b are applied to filters 60a and 60b tuned to the frequency of wheel rotation during the test cycle to provide sine wave signals which are free from miscellaneous noise. A standard multi-pole, narrow band pass filter has been found to be suitable to perform the filtering operation. As discussed hereinafter, when this type of fixed frequency filter is used, it will be necessary to assure that measurements are taken when the shaft is being driven at a fixed speed. The outputs of the filters 60a and 60b are applied through monostable switching circuits 68a and 68b, respectively, to weight meter driving circuits 70a and 70b, respectively. The switching circuits 68a and 68b each preferably include a field effect transistor (not shown) which is in a normally open, non-conductive state and which is placed in a closed, conductive state when a high voltage is applied thereto during a sampling cycle, as described hereinafter. The switching circuits are energized by the outputs of a pair of AND gates 72a and 72b. The outputs of the AND gates 72a and 72b will be high to close the switches 68a and 68b when the positive half of the force signal from filters 60a and 60b is being fed to the respective switching circuit 68a and 68b and a spin cycle control circuit 96 is providing a high signal on line 97 therefrom indicative of a decision to take weight measurements. The enabling signals for gates 72a and 72b are provided by differential amplifiers 73 which pass an enabling pulse only on the positive half-cycles of the input signals. When the switching circuits 68a and 68b are conductive the positive half or the sinusoidal force signal thereby passes to the respective weight meter driving circuit 70a and 70b. The meter driving circuits 70a and 70b integrate the signals from the respective switches 68a and 68b and store the values thereof. As will be appreciated by those skilled in the art, a buffering circuit is emloyed in each meter driving circuit to retain the last meter reading until the operator has had sufficient time to apply the necessary counter-balancing weights to the rims 11 and 13.

The encoder disc and optical switch assembly 14 produces two-phase displaced pulse trains at a frequency as determined by the rate of rotation of the shaft. The assembly 14 includes a disc 15 which is affixed to the shaft 10 and has a plurality of windows 16 (FIG. 2) uniformly spaced from each other along the periphery of the disc. the windows have a width (measured in the peripheral direction) which is exactly equal to the spacing between the adjacent windows. The assembly 14 further includes an optical switch portion 17 (FIG. 2) having two optical switches 18a and 18b mounted in a housing 19 which is rigidly affixed to the bearing housing 21. The housing 19 is U-shaped in cross-section (FIG. 1) surrounding the apertured edge of the disc 15, and the switches 18a and 18b each include a light source (such as a light emitting diode) on one side of the disc and a light sensitive transducer (such as phototransistor) on the opposing side of the disc. The switches register with the windows in the disc, and they are spaced from each other by a distance (measured tangentially to the disc) of one and one-half times the width of the windows, whereby the signal on lines 20a and 20b will be 90° out of phase with respect to each other, the direction of the phase displacement being dependent upon the direction of revolution of the shaft 10.

The leads 20a and 20b from the switches 18a and 18b direct the analog signals to a count pulse producing circuit 78 which, dependent upon the direction of revolution of balancing shaft 10, provides either a train of count-up pulses on a first output lead 80a therefrom or a train of count-down pulses on a second output lead 80b therefrom. The leads 80a and 80b are connected to a first up-down counter 84a and to a second up-down counter 84b, with the lead 80a being connected to the up-count inputs and the lead 80b being connected to the down-count input. Both counters have a counting capacity exactly equal to the total number of count-up or count-down pulses generated by the circuit 78 during one complete revolution in one direction of the shaft 10.

The counters 84a and 84b are reset, or reinitialized, in accordance with the respective emplacement positions for the counterbalance weights in the planes P1 and P2 as indicated by a selected phase angle of the respective signals from the filters 60a and 60b, the selected phase angle being 0° when the unbalanced weight with respect to planes P1 or P2 is up. the logic circuitry for reinitializing the counters is discussed hereinafter. As a result of the re-initialization of the counters at the selected phase angle of zero degrees (when the heavy spot is at top-dead-center), the counter outputs will be at mid-count, that is, at a count equal to one half of the total counting capacity, when the unbalanced weight is at bottom-dead-center. Accordingly, at mid-count the emplacement position for a counterbalancing weight will be at top-dead-center.

The digital outputs of the counters 84a and 84b are respectively applied to first and second digital-to-analog converters 86a and 86b which provide analog ramp voltage outputs to the position meter driving circuits 88a and 88b. The D/A circuits also shift the voltage level of the ramp voltage waveforms so that they are centered on zero volts, i.e., the mid-point of the voltage ramps are at zero degrees. The position meter driving circuits essentially comprise differential amplifiers which cause the output voltage from the D/A converters to move from maximum negative to maximum positive voltage in a narrow range centered on zero volts so that the associated meters 40 and 41 are more sensitive to small increments of rotation of the shaft 10 and wheel W in the vicinity of the position where the respective counterbalance weight is to be placed. To find the position at which a counter-balance weight is to be attached to a rim, the operator rotates the wheel until the position meter 40 or 41 for such rim indicates null, i.e., zero volts. It should be noted that the wheel may be rotated in either direction to bring a position meter to a null reading.

As previously noted, any corrective wheel weight emplacement orientation is possible with the apparatus of the present invention. Three ways of shifting the corrective weight emplacement position (assuming the force transducers to remain in a horizontal plane) are (1) providing a controlled phase displacement of the output of the filters 60a and 60b, (2) designing the logic circuitry reponsive to the outputs of the filters 60a and 60b to provide counter reset signals at other selected phase angles, and (3) delaying the application of the digital outputs from the counters 84a and 84b to the digital-to-analog converters 86a, 86b. Also, it will be recognized that rather than resetting the counter to zero, any preselected number can be set into the counter to shift the rotative wheel position at which the corrective weights are placed. These changes require relatively simple and inexpensive modifications of the electronic components, without necessitating any change in the construction of the mechanical elements of the balancer.

The logic circuitry for resetting the up-down counters in accordance with the phase of an associated unbalance force signal from filters 60a and 60b comprises parallel circuits, each circuit including a differential amplifier or comparator 73, a NAND gate Gl, and a capacitor C1 for coupling the leading (positive-going) edge of the output from the comparator to the NAND gate. With reference to that portion of the circuit for re-initializing the first up-down counter 84a in dependence on the zero-crossing phase of the analog output from the filter 60a, a first comparator 73 receives the sinusoidal output signal from the filter 60a, which signal has a phase related to the location of the counterbalance weight to be added to the first plane P1 of the wheel. A square wave signal is emitted from the comparator, with the square wave having a negative to positive transition when the sinusoidal unbalance signal from the filter 60a has a phase angle of 0° (i.e., positive moving zero crossing). The leading edge of the square wave from the comparator is thus coincident with the point in time when the heavy spot in the plane P1 of the rim 11 is at top-dead-center and the emplacement position for the counterbalance weight on rim 11 is at the bottom-dead-center thereof. If should be noted at this point that the pulse from the comparator 73 is used in conjunction with a pulse issued from the spin cycle control circuit 96 on lead 97 to enable the AND gates 72a and 72b and thus close the switching circuits 68a and 68b to permit the unbalance force signals to be applied to the meter driving circuits 70a and 70b, respectively. The leading edge of the square wave output of the comparator 73 is coupled by the capacitor C1 to the NAND gate G1. The enabling signal applied via line 97 is also applied, to the NAND gates G1. Hence, when the output of comparator 73 goes high, the output from the NAND gate G1 goes low to re-initialize the counter 84a. It will be noted tht when the positive signal on line 97 is terminated at the end of a testing cycle, no further reset pulses can be emitted, and thus the counters will then only continue to cycle in accordance with the wheel speed with the starting point being based upon the last reset signal received. Simultaneously, the switches 68a and 68b will become non-conductive, whereby the readings on the weight meters 38 and 39 will be fixed also.

The logic circuit for re-initializing the second counter 84b for determining the corrective weight emplacement position in the second plane P2 also includes a comparator 73 responsive to the sinusoidal output of the second filter 60b, a capacitor C1, and a NAND gate G1. This circuit, of course, functions in the same manner as that just described in connection with the first up-down counter 84a.

As illustrated in FIG. 4, the count pulse producing circuit 78 comprises two voltage level detectors, or comparators, 100a and 100b for squaring the analog output signals on lines 20a and 20b, respectively. Due to the phase displacement of the signals from the switches 18a and 18b, the output signal from the first detector 100a will advance or lag the signal from the second detector 100b by 90°. With reference to FIGS. 2 and 3, it is noted that when the shaft 10 is rotated clockwise (which is the direction in which the tire is spun), the analog signal from the switch 18a will lead that from the other switch 18b and accordingly the signal produced by the detector 100a will lead that from the other detector 100b by 90°.

The circuit 78 includes a pair of inverters 102a and 102b connected respectively to the outputs of the detectors 100a and 100b. The output of the inverters 102a and 102b are applied through a logic network, consisting of two inverters 104a and 104b and four one-shot circuits 106a, 106b, and 106c, and 106d, to a first AND/OR invert gate 107 (comprising a first bank of four AND gates 108a, 108b, 108c, and 108d and a NOR gate 112) and a second AND/OR invert gate 109 (comprising second bank of four AND gates 110a, 110b, 110c, and 110d and a NOR gate 114). The NOR gate 112 provides count-up pulses if one of the four AND gates 108a–108d produces an output signal; likewise, the NOR gate 114 provides count-down pulses if one of the four AND gates 110a–110d produces an output signal. The illustrated arrangement of logic circuitry acts as a pulse multiplier circuit to provide four count-up or four count-down pulses for each pulse on the respective input line 20a or 20b.

It will be recognized from the logic circuitry illustrated in FIG. 4 that the AND/OR invert gate 107 will provide a train of output pulses at four times the frequency of the input on line 20a whenever the signal on line 20a leads the signal on line 20b by 90°. When the signal on line 20b leads the signal on line 20a by 90°, the train of output pulses is provided on line 80b.

It will be appreciated that the present invention provides extremely accurate angular position finding with a minimum of cost since no complex electromechanical or electronic components are required. Specifically, with 64 windows being uniformly spaced along the periphery of the disc 15 and a multiplication factor of 4 being provided by the count pulse producing circuit 78, an accuracy of ±1.4° is achieved.

The spin cycle control circuit 96 includes a shaft speed detection means driven by the train of count-up pulses on the line 80a, the details of such detection means being entirely conventional and not being illustrated herein. When the motor M has reached a certain preselected speed, the speed detection means senses such condition and generates a signal which, after a preset time delay, is transmitted to the motor to reverse the power windings thereto and quickly bring the shaft 10 to a stop. When the shaft speed detection means subsequently indicates zero speed (by the termination of signal on line 80a and the initiation of signal on line 80b), the reversing signal to the motor is removed and the shaft remains stopped. It is preferable to utilize a time delay after the shaft has reached a selected percentage of the operating speed of the motor; for example, a delay of 5 seconds may be provided after the achievement of a speed equal to 90 percent of the fixed operating speed of the motor. This sequence assures that the measurements (i.e., loading of the weight meters 38 and 39 and setting of the counters 84a and 84b) will be made at the operating speed of the motor, which is a speed generally the same as the wheel W will rotate at when it is being driven on an outomotive vehicle. It is important that the measurements be made when the shaft is at operating speed since the filters 60a and 60b are of a fixed frequency type.

A brief discussion of the operation of the balancer of the present invention will now be presented. After mounting the wheel W, the operator pushes the start switch 44. The motor is thus activated in the forward direction (through control circuit 96), and simultaneously, a high signal is transmitted on line 97 to initiate measurement of the counterbalance weight magnitudes and positions. After reaching the selected speed plus the predetermined time delay, the measurements will have been made while the motor is operating at the proper speed; then the control circuit 96 reverses the windings to the motor to brake rotation of the balancing shaft. Immediately at this point, the control circuit 96 removes the signal on line 97 whereby the switches 68a and 68b open and whereby reset pulses are no longer generated by the NAND gates G1. Thus, the weight meters 38 and 39 and the counters 84a and 84b will retain the respective magnitude and angular position information that they had on the last revolution of the shaft 10 prior to the time when the stop sequence was initiated. Upon reaching zero shaft speed, the motor braking mode signal is removed to leave the apparatus stopped. The counters 84a and 84b are now set to count pulses from starting positions associated with the unbalance magnitudes indicated by the respective weight meters 38 and 39, such that when the position meters 40 and 41 associated with the counters indicate a null, weights of the indicated magnitudes should be placed at the top and center of the respective rims. The operator then turns the wheel until one of the position meters 40 or 41 is nulled, and then places a counterbalance weight of the amount indicated by the associated weight meter 38 or 39, respectively, on the corresponding rim 11 or 13 at the top and center of the rim. The same wheel turning and weight emplacement operation is then carried out to place the corrective balancing weight on the other rim. The stop switch 46 is provided so that the operating sequence can be interrupted at any point if necessary.

Although the best mode contemplated for carrying out the present invention has been herein shown and described, it will be apparent that modification and variation may be made without departing from what is regarded to be the subject matter of the invention.

What is claimed is:

1. In combination with an apparatus for measuring the imbalance of a rotary body in at least one plane normal to the axis of the rotary body including means for rotating the body about its axis, means for detecting forces generated by the imbalance in said plane and for generating signals representative of the magnitude and angular position of said imbalance in said plane, means responsive to said signals for displaying the magnitude of a weight to be added to said body in said plane to correct said imbalance, and means responsive to said signals for indicating the angular position where the weight should be attached to said body in said plane to correct said imbalance, the improvement comprising: means for generating pulses in synchronous relation to the rotation of said body, a digital counter responsive to said pulses for determining the angular position of said body, means responsive to said signals from said detecting means for enabling said counter to start counting at a point in time corresponding to when the angular position of imbalance in said plane of the body is at a preselected rotative position, and means for applying the output of said counter to said position indicating means to thereby indicate when said body is in said rotative position.

2. The apparatus of claim 1 wherein said means for rotating includes a shaft removably secured to said rotary body, said detecting means including electrical force transducers mounted in a horizontal plane containing the axis of said shaft to thereby detect an imbalance position which is in a vertical plane containing the axis of said body whereby said counter enabling means will cause said counter to start counting when said imbalance position is in said vertical plane, and said means for applying the output of said counter to said position indicating means including means for causing said position indicating means to indicate the position of imbalance to be at a selected angular position relative to said vertical plane.

3. The apparatus of claim 1 wherein said counter counts both up and down, said means for generating pulses providing up count pulses as well as down count pulses, and control means for applying said up count pulses to the counter when said body is rotated by said body rotating means in one direction and for applying said down count pulses when said body is rotated in the opposite direction.

4. The apparatus of claim 3 wherein said position indicating means has a single indicative position for indicating the proper rotative position of the body at which the corrective weight may be added, said position indicating means further including means for indicating the direction to rotate said body to bring it into said proper rotative position with the least amount of rotative movement.

5. An apparatus for determining the imbalance in a vehicle wheel comprising a rotary wheel-supporting and driving shaft;
   resiliently mounted bearing means for supporting the shaft for rotation;
   means for rotating such shaft with the wheel mounted thereon;
   electrical transducers associated with the bearing means to provide respective signals in dependence on the oscillating forces applied to said bearing means as a result of the rotation of the wheel supported and driven by said shaft;
   computing circuit means responsive to said signals from said electrical transducers for developing first and second analog signals, the first analog signal representing the unbalance of the wheel in a first plane normal to said driving shaft and containing one end face of the wheel, and the second analog signal representing the unbalance in a second plane parallel to the first plane and spaced a distance therefrom;
   an impulse generator means driven in relation with the shaft for producing clock pulses synchronized with the rotation of the shaft;
   first digital means for counting said pulses and for producing a first digital output indicative of the rotational position of said shaft;
   second digital means for counting said pulses and for producing a second digital output indicative of the rotational position of said shaft;
   means responsive to said first analog signal for applying a first reset signal to said first counting means when said first analog signal has a predetermined phase angle;
   means responsive to said second analog signal for applying a second reset signal to said second counting means when said second analog signal has a predetermined phase angle;
   means responsive to said first analog signal for displaying the magnitude of unbalance of the wheel in said first plane to thereby indicate the amount of a first counterweight to be applied to the wheel in said first plane;
   means responsive to said first digital output generated by said first counting means for indicating the angular location in said first plane where said first counterweight is to be applied;
   means responsive to said second analog signal for displaying the magnitude of unbalance of the wheel in said second plane to thereby indicate the amount of second counterweight to be applied to the wheel in said second plane; and
   means responsive to said second digital output produced by said counting means for indicating the angular location in said second plane where said second counteweight is to be applied.

6. The apparatus of claim 5 wherein said electrical transducers are mounted in a horizontal plane, said computing means for producing said first and second analog signals including means for filtering the output signals from said transducers to produce said first and second analog signals each having a sine-wave shape and a phase relative to the phase relative to the phase of the output signal from the transducer as determined by the location of the unbalanced weight in the associated plane, each of said filtered signals being phased such that the counterbalance weight will be applied at the top centered position of the wheel.

7. The apparatus of claim 5 wherein said first and second counting means count both up and down, said impulse generator means providing up count pulses as well as down count pulses, and control means for applying said up count pulses to the counter when said wheel is rotated by said rotating means in one direction and for applying said down count pulses when said wheel is rotated in the opposite direction.

* * * * *